US012010782B2

(12) United States Patent
Horrod et al.

(10) Patent No.: US 12,010,782 B2
(45) Date of Patent: Jun. 11, 2024

(54) HEATING ELEMENT SUITABLE FOR AEROSOLIZABLE MATERIAL

(71) Applicant: Nicoventures Trading Limited, London (GB)

(72) Inventors: Martin Daniel Horrod, Cambridge (GB); Julian Darryn White, Cambridge (GB)

(73) Assignee: NICOVENTURES TRADING LIMITED, London (GB)

( * ) Notice: Subject to any disclaimer, the term of this patent is extended or adjusted under 35 U.S.C. 154(b) by 333 days.

(21) Appl. No.: 15/733,327

(22) PCT Filed: Dec. 18, 2018

(86) PCT No.: PCT/EP2018/085686
§ 371 (c)(1),
(2) Date: Jun. 26, 2020

(87) PCT Pub. No.: WO2019/129553
PCT Pub. Date: Jul. 4, 2019

(65) Prior Publication Data

US 2021/0112859 A1 Apr. 22, 2021

(30) Foreign Application Priority Data

Dec. 28, 2017 (GB) ..................................... 1722177

(51) Int. Cl.

| | |
|---|---|
| ***A24F 13/00*** | (2006.01) |
| ***A24F 40/465*** | (2020.01) |
| ***H05B 6/10*** | (2006.01) |
| *A24F 40/20* | (2020.01) |
| *A24F 40/70* | (2020.01) |

(52) U.S. Cl.
CPC ........... *H05B 6/108* (2013.01); *A24F 40/465* (2020.01); *A24F 40/20* (2020.01); *A24F 40/70* (2020.01); *H05B 2206/023* (2013.01)

(58) Field of Classification Search
CPC ........................................................ A24F 47/00
USPC .................................................. 131/328–329
See application file for complete search history.

(56) References Cited

U.S. PATENT DOCUMENTS

| | | | | |
|---|---|---|---|---|
| 5,224,498 | A | 7/1993 | Deevi | |
| 5,613,505 | A | 3/1997 | Campbell et al. | |
| 10,321,719 | B2 * | 6/2019 | Peuchert | H05B 3/46 |
| 11,382,358 | B2 * | 7/2022 | Batista | H05B 6/108 |
| 2016/0150825 | A1 | 6/2016 | Mironov | |

(Continued)

FOREIGN PATENT DOCUMENTS

| | | |
|---|---|---|
| CN | 203748673 | 8/2014 |
| CN | 106617325 A | 5/2017 |

(Continued)

OTHER PUBLICATIONS

International Search Report and Written Opinion, Application No. PCT/EP2018/085686, dated May 9, 2019, 16 pages.

(Continued)

*Primary Examiner* — Phuong K Dinh
(74) *Attorney, Agent, or Firm* — Husch Blackwell

(57) ABSTRACT

Disclosed is a heating element for use in heating aerosolizable material to volatilize at least one component of the aerosolizable material. The heating element includes a heat resistant support and a coating on the support. The coating includes cobalt.

16 Claims, 4 Drawing Sheets

(56) References Cited

U.S. PATENT DOCUMENTS

| | | | | |
|---|---|---|---|---|
| 2017/0055580 | A1* | 3/2017 | Blandino | A24D 1/20 |
| 2017/0086508 | A1* | 3/2017 | Mironov | A24F 40/46 |
| 2017/0118051 | A1 | 4/2017 | Al-Dweik et al. | |
| 2017/0119051 | A1* | 5/2017 | Blandino | H05B 3/34 |
| 2020/0260777 | A1* | 8/2020 | Rojo-Calderon | A24C 5/01 |

FOREIGN PATENT DOCUMENTS

| | | | |
|---|---|---|---|
| JP | 2001037626 | A | 2/2001 |
| JP | 2016525341 | A | 8/2016 |
| JP | 2017506915 | A | 3/2017 |
| JP | 2017533732 | A | 11/2017 |
| JP | 2021508438 | A | 3/2021 |
| RU | 2132629 | C1 | 7/1999 |
| WO | WO 2015/177294 | | 11/2015 |
| WO | WO 2016156500 | | 10/2016 |
| WO | WO 2016184928 | | 11/2016 |
| WO | WO 2016184929 | | 11/2016 |
| WO | WO 2016184930 | | 11/2016 |
| WO | WO 2017029268 | | 2/2017 |
| WO | WO 2017029269 | | 2/2017 |
| WO | WO 2017029270 | | 2/2017 |
| WO | WO 2017036950 | | 3/2017 |
| WO | WO 2017036955 | | 3/2017 |
| WO | 2017068094 | A1 | 4/2017 |
| WO | 2017068099 | A1 | 4/2017 |
| WO | WO 2017068098 | | 4/2017 |
| WO | 2017207581 | A1 | 12/2017 |
| WO | WO 2018178095 | | 10/2018 |

OTHER PUBLICATIONS

"International Preliminary Report on Patentability for Patent Application No. PCT/EP2018/085686, dated Jul. 9, 2020", 9 pages.

* cited by examiner

HEATING ELEMENT SUITABLE FOR AEROSOLIZABLE MATERIAL

PRIORITY CLAIM

The present application is a National Phase entry of PCT Application No. PCT/EP2018/085686, filed Dec. 18, 2018, which claims priority from Great Britain Patent Application No. 1722177.1, filed Dec. 28, 2017, each of which is hereby fully incorporated herein by reference.

TECHNICAL FIELD

The present disclosure relates to heating elements for use in heating aerosolizable material to volatilize at least one component of the aerosolizable material, articles for use with apparatus for heating aerosolizable material to volatilize at least one component of the aerosolizable material, and to apparatus for heating aerosolizable material to volatilize at least one component of the aerosolizable material.

BACKGROUND

Smoking articles such as cigarettes, cigars and the like burn tobacco during use to create tobacco smoke. Attempts have been made to provide alternatives to these articles by creating products that release compounds without combusting. Examples of such products are so-called “heat not burn” products or tobacco heating devices or products, which release compounds by heating, but not burning, material. The material may be, for example, tobacco or other non-tobacco products, which may or may not contain nicotine.

SUMMARY

A first aspect of the present disclosure provides a heating element for use in heating aerosolizable material to volatilize at least one component of the aerosolizable material, wherein the heating element comprises a heat resistant support and a coating on the support, and wherein the coating comprises cobalt.

In an exemplary embodiment, the heating element is planar or substantially planar.

In an exemplary embodiment, the heating element is tubular or substantially tubular.

In an exemplary embodiment, the coating is located radially outwards of the support.

In an exemplary embodiment, the coating has a thickness of no more than 50 microns.

In an exemplary embodiment, the coating has a thickness of no more than 20 microns.

In an exemplary embodiment, the support comprises one or more materials selected from the group consisting of: a metal, a metal alloy, a ceramics material, and a plastics material. In an exemplary embodiment, the support comprises stainless steel.

In an exemplary embodiment, the heating element comprises a heat resistant protective coating, and the coating comprising cobalt is located between the support and the heat resistant protective coating.

In an exemplary embodiment, the cobalt coating is encapsulated.

In an exemplary embodiment, the heat resistant protective coating and the support together encapsulate the cobalt coating.

In an exemplary embodiment, the heat resistant protective coating encapsulates the cobalt coating and the support.

In an exemplary embodiment, the heat resistant protective coating comprises one or more materials selected from the group consisting of: a ceramics material, metal nitride, titanium nitride, and diamond.

In an exemplary embodiment, the heat resistant protective coating has a thickness of no more than 50 microns.

In an exemplary embodiment, the heat resistant protective coating has a thickness of no more than 20 microns.

A second aspect of the present disclosure provides an article for use with apparatus for heating aerosolizable material to volatilize at least one component of the aerosolizable material, wherein the article comprises the heating element of the first aspect of the present disclosure, and aerosolizable material in thermal contact with the heating element.

In an exemplary embodiment, the aerosolizable material is in surface contact with the heating element.

In an exemplary embodiment, the aerosolizable material is reconstituted, cellulosic, or in gel form.

In an exemplary embodiment, the aerosolizable material comprises tobacco and/or one or more humectants.

In an exemplary embodiment, the article is substantially cylindrical.

A third aspect of the present disclosure provides a system for heating aerosolizable material to volatilize at least one component of the aerosolizable material, the system comprising: the article of the second aspect of the present disclosure; and apparatus for heating the aerosolizable material of the article to volatilize at least one component of the aerosolizable material of the article, the apparatus comprising a heating zone for receiving the article, and a device for causing heating of the heating element of the article when the article is in the heating zone.

In an exemplary embodiment, the device comprises a magnetic field generator for generating a varying magnetic field for penetrating the heating element of the article when the article is in the heating zone.

A fourth aspect of the present disclosure provides apparatus for heating aerosolizable material to volatilize at least one component of the aerosolizable material, the apparatus comprising: a heating zone for receiving an article comprising aerosolizable material; the heating element of the first aspect of the present disclosure for heating the heating zone; and a device for causing heating of the heating element.

In an exemplary embodiment, the device comprises a magnetic field generator for generating a varying magnetic field for penetrating the heating element in use.

In an exemplary embodiment, the heating element projects into the heating zone.

A fifth aspect of the present disclosure provides a system for heating aerosolizable material to volatilize at least one component of the aerosolizable material, the system comprising: the apparatus of the fourth aspect of the present disclosure; and the article for locating in the heating zone of the apparatus.

BRIEF DESCRIPTION OF THE DRAWINGS

Embodiments of the disclosure will now be described, by way of example only, with reference to the accompanying drawings, in which.

DETAILED DESCRIPTION

Figure 1:
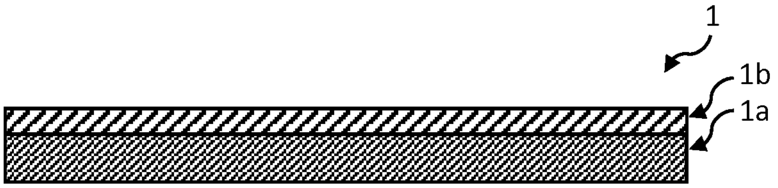
FIG. 1 shows a schematic cross-sectional side view of an example of a heating element for use in heating aerosolizable material to volatilize at least one component of the aerosolizable material.

As used herein, the term "aerosolizable material" includes materials that provide volatilized components upon heating, typically in the form of vapor or an aerosol. "Aerosolizable material" may be a non-tobacco-containing material or a tobacco-containing material. "Aerosolizable material" may, for example, include one or more of tobacco per se, tobacco derivatives, expanded tobacco, reconstituted tobacco, tobacco extract, homogenized tobacco or tobacco substitutes. The aerosolizable material can be in the form of ground tobacco, cut rag tobacco, extruded tobacco, reconstituted tobacco, reconstituted aerosolizable material, liquid, gel, gelled sheet, powder, or agglomerates, or the like. "Aerosolizable material" also may include other, non-tobacco, products, which, depending on the product, may or may not contain nicotine. "Aerosolizable material" may comprise one or more humectants, such as glycerol or propylene glycol.

As used herein, the term "heating material" or "heater material" refers to material that is heatable by penetration with a varying magnetic field.

Induction heating is a process in which an electrically-conductive object is heated by penetrating the object with a varying magnetic field. The process is described by Faraday's law of induction and Ohm's law. An induction heater may comprise an electromagnet and a device for passing a varying electrical current, such as an alternating current, through the electromagnet. When the electromagnet and the object to be heated are suitably relatively positioned so that the resultant varying magnetic field produced by the electromagnet penetrates the object, one or more eddy currents are generated inside the object. The object has a resistance to the flow of electrical currents. Therefore, when such eddy currents are generated in the object, their flow against the electrical resistance of the object causes the object to be heated. This process is called Joule, ohmic, or resistive heating. An object that is capable of being inductively heated is known as a susceptor.

It has been found that, when the susceptor is in the form of a closed electrical circuit, magnetic coupling between the susceptor and the electromagnet in use is enhanced, which results in greater or improved Joule heating.

Magnetic hysteresis heating is a process in which an object made of a magnetic material is heated by penetrating the object with a varying magnetic field. A magnetic material can be considered to comprise many atomic-scale magnets, or magnetic dipoles. When a magnetic field penetrates such material, the magnetic dipoles align with the magnetic field. Therefore, when a varying magnetic field, such as an alternating magnetic field, for example as produced by an electromagnet, penetrates the magnetic material, the orientation of the magnetic dipoles changes with the varying applied magnetic field. Such magnetic dipole reorientation causes heat to be generated in the magnetic material.

When an object is both electrically-conductive and magnetic, penetrating the object with a varying magnetic field can cause both Joule heating and magnetic hysteresis heating in the object. Moreover, the use of magnetic material can strengthen the magnetic field, which can intensify the Joule and magnetic hysteresis heating.

In each of the above processes, as heat is generated inside the object itself, rather than by an external heat source by heat conduction, a rapid temperature rise in the object and more uniform heat distribution can be achieved, particularly through selection of suitable object material and geometry, and suitable varying magnetic field magnitude and orientation relative to the object. Moreover, as induction heating and magnetic hysteresis heating do not require a physical connection to be provided between the source of the varying magnetic field and the object, design freedom and control over the heating profile may be greater, and cost may be lower.

During induction heating, energy from a varying magnetic field is transferred to the susceptor to induce one or more varying currents in the susceptor, causing the temperature of the susceptor to rise. In order that the susceptor heats up as efficiently as possible, the transfer of energy to the susceptor should be as lossy as possible, so that the energy in the currents is quickly converted to heat. Reducing the thermal mass of the susceptor increases the change in temperature for a given energy input, and reducing the overall magnitude of the induced currents can help to reduce or avoid energy being reflected back into the magnetic field generator.

In producing a practical system for a consumer product, many aspects have to be taken into account, including cost, material availability, ease of forming during manufacture and longevity (including resistance to corrosion). Although mild steel has some of these benefits, due to its vulnerability to corrosion it may be unsuitable for prolonged use. Additionally, and possibly due to reasons linked with its vulnerability to corrosion, very thin sheets of mild steel have limited availability.

Conversely, stainless steel is more widely available and is far more robust than mild steel in use. Unfortunately, for an induction heating system, its use is limited due to a lack of ferromagnetic properties. From the perspective of ohmic heating, stainless steel can be around six to seven times more resistive than mild steel, but the ability of stainless steel to be magnetized is negligible due to its value of relative permeability GO being around one. By way of comparison, the corresponding value for mild steel can be about one hundred. There are some stainless-steel alloys that have higher values of value of relative permeability GO, such as the 430 grades of stainless steel, but these tend to lie at the specialist ends of the market and are not widely available, particularly in thin cross sections.

The present disclosure is predicated on a finding of the inventors of how an acceptable compromise between cost and performance can be achieved to produce a practical induction heater susceptor.

For conductive (and magnetizable) media there is a characteristic depth (the "skin depth") into which the electromagnetic field is able to penetrate. In mild steel, the electromagnetic field will penetrate with an exponential dependence on distance from the surface. Therefore, the field strength, and by implication the energy contained therein, will be mostly absorbed in approximately 25 microns of material. The calculation for stainless steel gives a characteristic absorption depth of approximately 280 microns, indicating that a much thicker susceptor would be needed to extract the same amount of energy from a given magnetic field.

The present inventors have found that, if a surface of a heating element, such as a surface facing the magnetic field generator, is coated with a thin coating (such as a few microns) of pure nickel, then the coating need only be approximately 15 microns thick to effect the same absorption as a thicker mild steel plate. The nickel could for example be applied by a chemical plating method, an electro-chemical plating method, or by vacuum evaporation. Moreover, if cobalt is used instead of nickel, the coating or layer thickness can be reduced to approximately 10 microns. A thickness of one or more skin depths should help to ensure that a majority of the available energy is directed into the susceptor. A thickness of around two skin depths may be optimal in some embodiments. Cobalt also can be applied by plating.

Furthermore, cobalt has a higher Curie point temperature than nickel (around 1,120 to 1,127 degrees Celsius, versus 353 to 354 degrees Celsius). The Curie point temperature, or Curie Temperature, is the temperature at which certain magnetic materials undergo a sharp change in their magnetic properties. It is understood that the Curie point temperature is the temperature below which there is spontaneous magnetization in the absence of an externally applied magnetic field, and above which the material is paramagnetic. For example, the Curie point temperature is the magnetic transformation temperature of a ferromagnetic material between its ferromagnetic and paramagnetic phase. When such a magnetic material reaches its Curie point temperature, its magnetic permeability reduces or ceases, and the ability of the material to be heated by penetration with a varying magnetic field also reduces or ceases. That is, it may not be possible to heat the material above its Curie point temperature by magnetic hysteresis heating. As cobalt has a Curie point temperature well above the normal operating temperatures of heating elements of embodiments of the present disclosure, the effect of the Curie point temperature will be much less pronounced (or even, in some embodiments, indiscernible) during normal operation than if nickel were to be used instead.

The support on which the cobalt coating or layer is provided need not interact with the applied varying magnetic field to generate heat in the support. That is, the support need not itself be heatable by penetration with a varying magnetic field. All the support need be able to achieve is supporting the cobalt coating while resisting the heat generated therein. Accordingly, the support can be made from any suitable heat resistant material. Example materials are aluminum, steel, copper, and high temperature polymers such as polyether ether ketone (PEEK) or Kapton.

Accordingly, heating elements of example embodiments of the present disclosure enable efficient transfer of energy from a varying magnetic field into the heating element while retaining the benefits of relatively low cost, ease of material availability, and ease of forming during manufacture.

The cobalt coating may become increasingly susceptible to oxidation as it increases in temperature. This can increase heat loss due to radiation by increasing the relative emissivity (εr) relative to the unoxidized metal surface, enhancing the rate at which energy is lost through radiation. If the energy radiated ends up being lost to the environment, then such radiation can reduce the system energy efficiency. Oxidation can also reduce the resistance of the cobalt coating to chemical corrosion, which could result in shortening the service life of the heating element. In some embodiments, therefore, the cobalt coating is coated with a heat resistant protective coating, such as titanium nitride. Titanium nitride can be applied using physical vapor deposition, for example. Other example heat resistant protective coatings are a ceramics material, metal nitride, and diamond. In some embodiments, the heat resistant protective coating can be provided in a different way, such as by chemically treating the cobalt coating to encourage growth of a protective film over the cobalt coating, or formation of a protective oxide layer using a process such as anodization. In addition to protecting the underlying cobalt coating from oxidation, the heat resistant protective coating may also help to physically protect the cobalt coating from mechanical wear. In some embodiments, the cobalt coating is encapsulated. In some embodiments, the heat resistant protective coating and the support may together encapsulate the cobalt coating. In some embodiments, the heat resistant protective coating may encapsulate the cobalt coating and the support.

In some embodiments, the heat resistant protective coating may have low or no electrical conductivity, so as not to (or not to significantly) result in the induction of electric currents in the heat resistant protective coating rather than the cobalt coating.

Some example embodiments will now be described with reference to the drawings.

FIG. 1 shows a schematic cross-sectional side view of an example of a heating element according to an embodiment of the disclosure. The heating element 1 is for use in heating aerosolizable material to volatilize at least one component of the aerosolizable material. The heating element 1 may be for use in apparatus for heating aerosolizable material to volatilize at least one component of the aerosolizable material, and/or may be for use in an article for use with apparatus for heating aerosolizable material to volatilize at least one component of the aerosolizable material. The heating element 1 is planar or substantially planar. However, in other embodiments the heating element 1 may be non-planar.

The heating element 1 comprises a heat resistant support 1*a*. The heat resistant support 1*a* of this embodiment comprises steel, and more specifically stainless steel. However, in other embodiments, the heat resistant support 1*a* may for example comprise one or more materials selected from the group consisting of: a metal, a metal alloy, a ceramics material, and a plastics material. For example, in some embodiments, the heat resistant support 1*a* may comprise steel, mild steel, aluminum, copper, or a high temperature polymer such as polyether ether ketone (PEEK) or Kapton.

The heating element 1 comprises a layer, film or coating 1*b* on the support 1*a*. The coating 1*b* comprises cobalt. In this embodiment, the cobalt coating 1*b* has a thickness of about 10 microns. However, in other embodiments, the cobalt coating 1*b* may have a different thickness, such as a thickness of no more than 50 microns or no more than 20 microns. The coating may be a plating.

Figure 2:
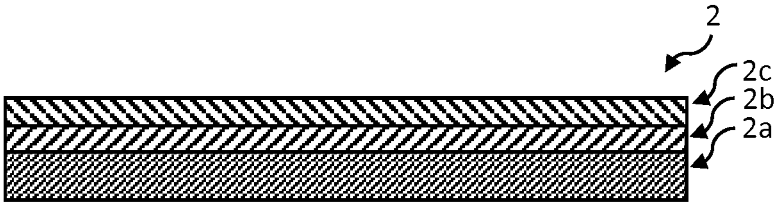
FIG. 2 shows a schematic cross-sectional side view of an example of another heating element for use in heating aerosolizable material to volatilize at least one component of the aerosolizable material.

FIG. 2 shows a schematic cross-sectional side view of an example of another heating element according to an embodiment of the disclosure. The heating element 2 of FIG. 2 comprises a heat resistant support 2*a*, and a coating 2*b* comprising cobalt located on the support 2*a*. The heating element 2 may be for use in apparatus for heating aerosolizable material to volatilize at least one component of the aerosolizable material, and/or may be for use in an article for use with apparatus for heating aerosolizable material to volatilize at least one component of the aerosolizable material.

The heating element 2 is planar or substantially planar. However, in other embodiments the heating element 2 may be non-planar. The heating element 2 of FIG. 2 is the same as the heating element 1 of FIG. 1 except that the heating element 2 of FIG. 2 also comprises a heat resistant protective coating 2*c*. The heat resistant protective coating 2*c* is provided on the cobalt coating 2*b*. More specifically, the cobalt coating 2*b* is located between the support 2*a* and the heat resistant protective coating 2*c*. The heat resistant protective coating 2*c* of this embodiment comprises titanium nitride. However, in other embodiments, the heat resistant protective coating 2*c* may for example comprise one or more materials selected from the group consisting of: a ceramics material, metal nitride, titanium nitride, and diamond. In this embodiment, the heat resistant protective coating 2*c* has a thickness of about 10 microns. However, in other embodiments, the heat resistant protective coating 2*c* may have a different thickness, such as a thickness of no more than 50 microns or no more than 20 microns. Any of the herein-described possible variations to the embodiment of FIG. 1 may be made to the embodiment of FIG. 2 to form further embodiments.

Figure 3:
FIG. 3 shows a schematic cross-sectional side view of an example of a further heating element for use in heating aerosolizable material to volatilize at least one component of the aerosolizable material.

FIG. 3 shows a schematic cross-sectional side view of an example of another heating element according to an embodiment of the disclosure. The heating element 3 of FIG. 3 comprises a heat resistant support 3*a*, a coating 3*b* comprising cobalt located on the support 3*a*, and a heat resistant protective coating 3*c* arranged so that the cobalt coating 3*b* is located between the support 3*a* and the heat resistant protective coating 3*c*. The heating element 3 may be for use in apparatus for heating aerosolizable material to volatilize at least one component of the aerosolizable material, and/or may be for use in an article for use with apparatus for heating aerosolizable material to volatilize at least one component of the aerosolizable material.

The heating element 3 is planar or substantially planar. However, in other embodiments the heating element 3 may be non-planar. The heating element 3 of FIG. 3 is the same as the heating element 2 of FIG. 2 except that, in the embodiment of FIG. 2, the cobalt coating 2*b* and the heat resistant protective coating 2*c* are located only on one side of the heat resistant support 2*a*, whereas in the embodiment of FIG. 3 the cobalt coating 3*b* and the heat resistant protective coating 3*c* are located on each of two opposite major sides of the heat resistant support 3*a*. That is, in the embodiment of FIG. 3, the support 3*a* is located between two volumes of the cobalt coating 3*b*, and the combination of the support 3*a* and the volumes of the cobalt coating 3*b* is located between two volumes of the heat resistant protective coating 3*c*. In another embodiment, the heat resistant protective coating 3*c* may be omitted or provided on only one side of the combination of the support 3*a* and the volumes of the cobalt coating 3*b*. Any of the herein-described possible variations to the embodiments of FIGS. 1 and 2 may be made to the embodiment of FIG. 3 to form further embodiments.

Figure 4:
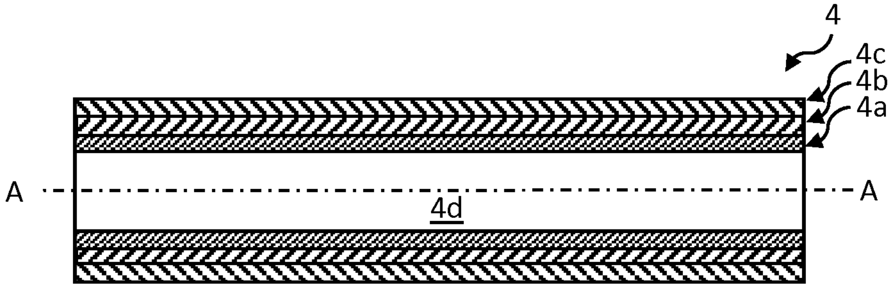
FIG. 4 shows a schematic cross-sectional side view of an example of a still further heating element for use in heating aerosolizable material to volatilize at least one component of the aerosolizable material.

FIG. 4 shows a schematic cross-sectional side view of an example of a heating element according to another embodiment of the disclosure. The heating element 4 of FIG. 4 again comprises a heat resistant support 4*a*, a coating 4*b* comprising cobalt located on the support 4*a*, and a heat resistant protective coating 4*c* arranged so that the cobalt coating 4*b* is located between the support 4*a* and the heat resistant protective coating 4*c*. The heating element 4 may be for use in apparatus for heating aerosolizable material to volatilize at least one component of the aerosolizable material, and/or may be for use in an article for use with apparatus for heating aerosolizable material to volatilize at least one component of the aerosolizable material.

In this embodiment, the heating element 4 is substantially cylindrical with a substantially circular cross section, but in other embodiments the heating element 4 may have an oval or elliptical cross section or be other than cylindrical. In some embodiments, the heating element 4 may have a polygonal, quadrilateral, rectangular, square, triangular, star-shaped, or irregular cross section, for example. In this embodiment, the heating element 4 is tubular with a hollow inner region 4*d*. In other embodiments, the heating element 4 may have an axially-extending gap in its circumference yet the heating element 4 may still be substantially tubular. In some embodiments, the heating element 4 may be a rod. In some embodiments, material, such as aerosolizable material, may be located in, or fill, the inner region 4*d*.

In this embodiment, the heating element 4 is elongate and has a longitudinal axis A-A. In other embodiments, the heating element 4 is may not be elongate. In some such other embodiments, the heating element 4 is still has an axial direction A-A that is perpendicular to the cross section of the heating element 4.

In this embodiment, the cobalt coating 4*b* is located radially outwards of the heat resistant support 4*a*. That is, the cobalt coating 4*b* is on an outer side of the heat resistant support 4*a*. Moreover, in this embodiment, a radially inward facing side of the heat resistant support 4*a* is free from a cobalt coating 4*b*. In other embodiments, a cobalt coating 4*b* may be provided radially inwards of the heat resistant support 4*a* in addition to, or alternatively to, radially outwards of the heat resistant support 4*a*. However, if a cobalt coating 4*b* is provided radially inwardly in addition to radially outwardly, the thermal mass of the heating element 4 may be increased, which can reduce the rate at which the heating element 4 is heatable by a given varying magnetic field in use.

In this embodiment, the heat resistant protective coating 4*c* is located radially outwards of the heat resistant support 4*a* and the cobalt coating 4*b*. That is, the heat resistant protective coating 4*c* is on an outer side of the cobalt coating 4*b*. Moreover, in this embodiment, a radially inward facing side of the heat resistant support 4*a* is free from a heat resistant protective coating 4*c*. However, in other embodiments, a heat resistant protective coating 4*c* may be provided radially inwards of the heat resistant support 4*a* in addition to, or alternatively to, radially outwards of the heat resistant support 4*a*. However, again, if a heat resistant protective coating 4*c* is provided radially inwardly in addition to radially outwardly, the thermal mass of the heating element 4 may be increased.

In some embodiments that are respective variations to the illustrated embodiments, the cobalt coating 2*b*, 3*b*, 4*b* is encapsulated. In some embodiments that are respective variations to the illustrated embodiments, the heat resistant protective coating 2*c*, 3*c*, 4*c* and the support 2*a*, 3*a*, 4*a* together encapsulate the cobalt coating 2*b*, 3*b*, 4*b*. In some other embodiments that are respective variations to the illustrated embodiments, the heat resistant protective coating 2*c*, 3*c*, 4*c* encapsulates the cobalt coating 2*b*, 3*b*, 4*b* and the support 2*a*, 3*a*, 4*a*.

Figure 5:
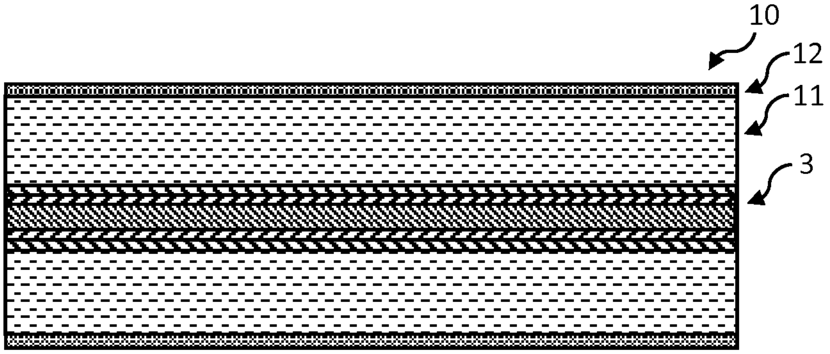
FIG. 5 shows a schematic cross-sectional side view of an example of an article for use with apparatus for heating aerosolizable material to volatilize at least one component of the aerosolizable material, the article comprising the heating element of FIG. 3.

FIG. 5 shows a schematic cross-sectional side view of an example of an article according to an embodiment of the disclosure. The article 10 is for use with apparatus for heating aerosolizable material to volatilize at least one component of the aerosolizable material.

The article 10 comprises the heating element 3 of FIG. 3, and aerosolizable material 11. The aerosolizable material 11 may be any of the aerosolizable materials discussed herein, such as reconstituted aerosolizable material (e.g. reconstituted tobacco) or in the form of a gel. The article 10 may comprise a substrate, such as a paper, that is impregnated or coated with the aerosolizable material 11, such as a gel. The aerosolizable material 11 may be cellulosic aerosolizable material.

The article 10 is substantially cylindrical with a substantially circular cross section, but in other embodiments the article 10 may have an oval or elliptical cross section or be other than cylindrical. In some embodiments, the article 10 may have a polygonal, quadrilateral, rectangular, square, triangular, star-shaped, or irregular cross section, for example. In this embodiment, the article 100 is a rod.

In this embodiment, the article 10 is elongate and has a longitudinal axis B-B. The longitudinal axis B-B of the article 10 is coincident with the longitudinal axis A-A of the heating element 3. In other embodiments, the article 10 may not be elongate. In some such other embodiments, the article 10 still has an axial direction B-B that is perpendicular to the cross section of the article 10.

The aerosolizable material 11 is in thermal contact with the heating element 3. Accordingly, in use, heat generated in the heating element 3 is usable to heat the aerosolizable material 11 to volatilize at least one component of the aerosolizable material 11. In some embodiments, the aerosolizable material 11 is in surface contact with the heating element 3. Thus, heat may be conducted directly from the heating element to the aerosolizable material 11. This can help to further increase the efficiency of heating of the aerosolizable material 11. In other embodiments, the heating element 3 may be kept out of surface contact with the aerosolizable material 11. For example, in some embodiments, a thermally-conductive barrier that is free from heating material and aerosolizable material may space the heating element 3 from the aerosolizable material 11. In some embodiments, the thermally-conductive barrier may be a coating on the aerosolizable material 11 or on the heating element 3. The provision of such a barrier may be advantageous to help to dissipate heat to alleviate hot spots in the heating element 3.

The article 10 also comprises a wrapper 12 that is wrapped around the aerosolizable material 11. The wrapper 12 encircles the aerosolizable material 11 and may help to protect the aerosolizable material 11 from damage during transport and use. During use, the wrapper 12 may also help to direct the flow of air into and through the aerosolizable material 11, and may help to direct the flow of vapor or aerosol through and out of the aerosolizable material 11.

In this embodiment, the wrapper 12 is wrapped around the aerosolizable material 11 so that free ends of the wrapper 12 overlap each other. The wrapper 12 may form all of, or a majority of, a circumferential outer surface of the article 10. The wrapper 12 could be made of any suitable material, such as paper, card, reconstituted aerosolizable material (e.g. reconstituted tobacco), or heating material (e.g. a metal or metal alloy foil, such as aluminum foil). The wrapper 12 may also comprise an adhesive (not shown) that adheres the overlapped free ends of the wrapper 12 to each other. The adhesive may comprise one or more of, for example, gum Arabic, natural or synthetic resins, starches, and varnish. The adhesive helps prevent the overlapped free ends of the wrapper 12 from separating. In other embodiments, the adhesive may be omitted or the wrapper 12 may take a different from to that described. Any one of these types of wrapper may be applied to the other articles described or illustrated herein to form further embodiments. In some embodiments, the wrapped 12 may be omitted.

In some embodiments, the article 10 may comprise one or more further components. For example, the article 10 could comprise a filter for filtering aerosol or vapor released from the aerosolizable material 11 of the article 10 in use. The filter could be of any type used in the tobacco industry. For example, the filter may be made of cellulose acetate. The filter may be substantially cylindrical with a substantially circular cross section and a longitudinal axis. In other embodiments, the filter may have a different cross section, such as any of those discussed herein for articles, and/or be other than cylindrical, and/or not be elongate. In some embodiments, the filter abuts a longitudinal end of the aerosolizable material 11 and is axially aligned with the heating element 3. In other embodiments, the filter may be spaced from the aerosolizable material 11, such as by a gap and/or by one or more further components of the article 10. Example further component(s) are an additive or flavor source (such as an additive- or flavor-containing capsule or thread), which may be held by a body of filtration material or between two bodies of filtration material, for example.

In some embodiments, the article 10 comprises a wrap that is wrapped around the aerosolizable material 11 and the filter (when provided) to retain the filter relative to the aerosolizable material 11. The wrap may encircle the aerosolizable material 11 and the filter. During use, the wrap may also help to direct the flow of air into and through the aerosolizable material 11, and may help to direct the flow of vapor or aerosol through and out of the aerosolizable material 11. The wrap may be wrapped around the aerosolizable material 11 and the filter so that free ends of the wrap overlap each other. The wrap may form all of, or a majority of, a circumferential outer surface of the article 10. The wrap could be made of any suitable material, such as paper, card, or reconstituted aerosolizable material (e.g. reconstituted tobacco). The wrap may also comprise an adhesive (not shown), such as one of those discussed elsewhere herein, that adheres the overlapped free ends of the wrap to each other. The adhesive helps prevent the overlapped free ends of the wrap from separating. In other embodiments, the adhesive may be omitted or the wrap may take a different from to that described. In other embodiments, the filter may be retained relative to the aerosolizable material 11 by a connector other than the wrap, such as an adhesive.

Figure 6:
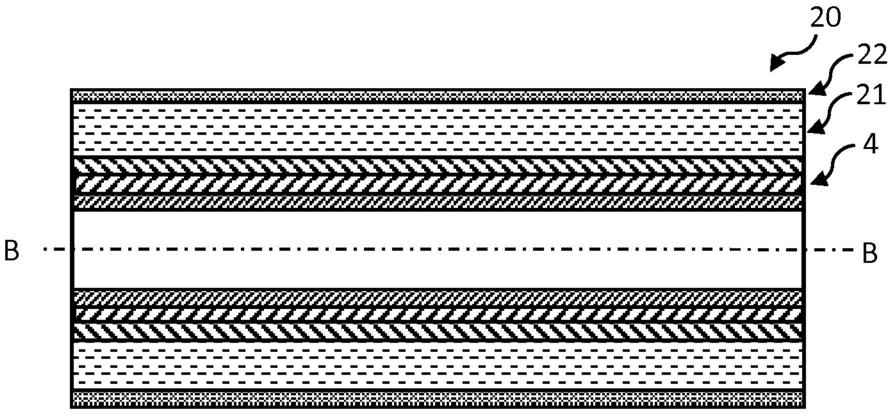
FIG. 6 shows a schematic cross-sectional side view of an example of another article for use with apparatus for heating aerosolizable material to volatilize at least one component of the aerosolizable material, the article comprising the heating element of FIG. 4.

FIG. 6 shows a schematic cross-sectional side view of an example of another article according to an embodiment of the disclosure. The article 20 is for use with apparatus for heating aerosolizable material to volatilize at least one component of the aerosolizable material. The article 20 of FIG. 6 is the same as that of FIG. 5, except that the article 20 has the heating element 4 of FIG. 4 in place of the heating element 3 of FIG. 3. The article 20 is tubular with a hollow inner region defined by the hollow inner region 4*d* of the heating element 4, and the wrapper 22 is wrapped around the aerosolizable material 21 and the heating element 4. Any of the possible variations to the article 10 of FIG. 5 discussed herein may be made to the article 20 of FIG. 6 to form further embodiments. Moreover, in some embodiments, material, such as aerosolizable material, may be located in, or fill, the inner region 4*d* of the heating element 4.

In some embodiments, the article 10, 20 may be provided together with apparatus for heating the aerosolizable material 11, 21 of the article 10, 20 to volatilize at least one component of the aerosolizable material 11, 21. Together, the article 10, 20 and the apparatus may be comprised in a system.

Figure 7:
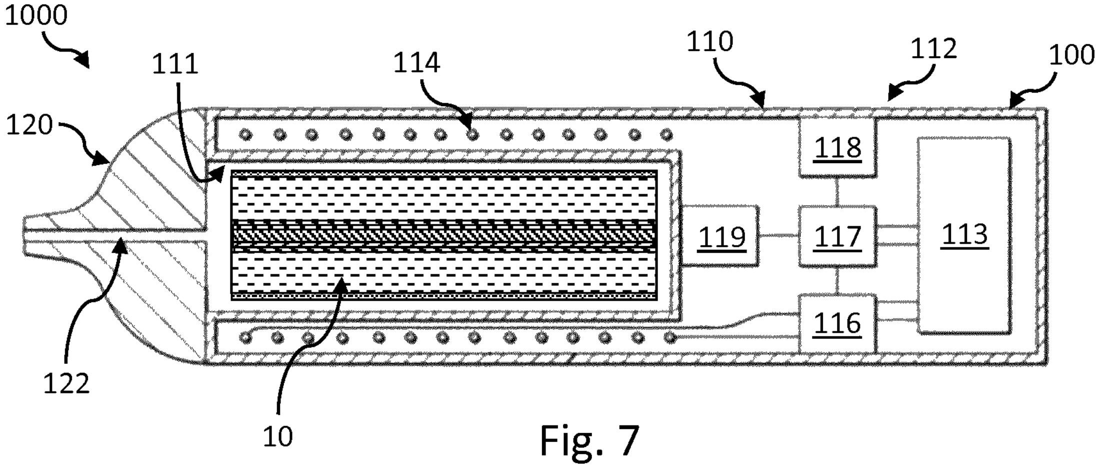
FIG. 7 shows a schematic cross-sectional side view of an example of a system comprising the article of FIG. 5 and apparatus for heating aerosolizable material of the article to volatilize at least one component of the aerosolizable material.

For example, FIG. 7 shows a schematic cross-sectional side view of an example of a system according to an embodiment of the disclosure. The system 1000 comprises the article 10 of FIG. 5 and apparatus 100 for heating the aerosolizable material 11 of the article 10 to volatilize at least one component of the aerosolizable material 11. In other embodiments, the article 10 may be replaced by any of the other articles described herein. In this embodiment, the apparatus 100 is a tobacco heating product (also known in the art as a tobacco heating device or a heat-not-burn device).

Broadly speaking, the apparatus 100 comprises a heating zone 111 for receiving the article 10, and a device 112 for causing heating of the heating element 3 of the article 10 when the article 10 is in the heating zone 111.

More specifically, the apparatus 100 of this embodiment comprises a body 110 and a mouthpiece 120. The mouthpiece 120 may be made of any suitable material, such as a plastics material, cardboard, cellulose acetate, paper, metal, glass, ceramic, or rubber. The mouthpiece 120 defines a channel 122 therethrough. The mouthpiece 120 is locatable relative to the body 110 so as to cover an opening into the heating zone 111. When the mouthpiece 120 is so located relative to the body 110, the channel 122 of the mouthpiece 120 is in fluid communication with the heating zone 111. In use, the channel 122 acts as a passageway for permitting volatilized material to pass from aerosolizable material of an article inserted in the heating zone 111 to an exterior of the apparatus 100. In this embodiment, the mouthpiece 120 is releasably engageable with the body 110 so as to connect the mouthpiece 120 to the body 110. In other embodiments, the mouthpiece 120 and the body 110 may be permanently connected, such as through a hinge or flexible member. In some embodiments, such as embodiments in which the article itself comprises a mouthpiece, the mouthpiece 120 of the apparatus 100 may be omitted.

The apparatus 100 may define an air inlet (not shown) that fluidly connects the heating zone 111 with the exterior of the apparatus 100. Such an air inlet may be defined by the body 110 and/or by the mouthpiece 120. A user may be able to inhale the volatilized component(s) of the aerosolizable material by drawing the volatilized component(s) through the channel 122 of the mouthpiece 120. As the volatilized component(s) are removed from the article 10, air may be drawn into the heating zone 111 via the air inlet of the apparatus 100.

In this embodiment, the body 110 comprises the heating zone 111. In this embodiment, the heating zone 111 comprises a recess 111 for receiving at least a portion of the article 10. In other embodiments, the heating zone 111 may be other than a recess, such as a shelf, a surface, or a projection, and may require mechanical mating with the article in order to co-operate with, or receive, the article. In this embodiment, the heating zone 111 is elongate, and is sized and shaped to accommodate the whole article 10. In other embodiments, the heating zone 111 may be other than elongate and/or dimensioned to receive only a portion of the article 10.

In this embodiment, the device 112 comprises a magnetic field generator 112 for generating a varying magnetic field for penetrating the heating element 3 of the article 10 when the article 10 is in the heating zone 111. However, in other embodiments, other forms of device 112 could be used.

In this embodiment, the magnetic field generator 112 comprises an electrical power source 113, a coil 114, a device 116 for passing a varying electrical current, such as an alternating current, through the coil 114, a controller 117, and a user interface 118 for user-operation of the controller 117.

The electrical power source 113 of this embodiment is a rechargeable battery. In other embodiments, the electrical power source 113 may be other than a rechargeable battery, such as a non-rechargeable battery, a capacitor, a battery-capacitor hybrid, or a connection to a mains electricity supply.

The coil 114 may take any suitable form. In this embodiment, the coil 114 is a helical coil of electrically-conductive material, such as copper. In some embodiments, the magnetic field generator 112 may comprise a magnetically permeable core around which the coil 114 is wound. Such a magnetically permeable core concentrates the magnetic flux produced by the coil 114 in use and makes a more powerful magnetic field. The magnetically permeable core may be made of iron, for example. In some embodiments, the magnetically permeable core may extend only partially along the length of the coil 114, so as to concentrate the magnetic flux only in certain regions. In some embodiments, the coil may be a flat coil. That is, the coil may be a two-dimensional spiral. In this embodiment, the coil 114 encircles the heating zone 111. The coil 114 extends along a longitudinal axis that is substantially aligned with a longitudinal axis of the heating zone 111. The aligned axes are coincident. In variations to this embodiment, the axes may be parallel, oblique or perpendicular to each other.

In this embodiment, the device 116 for passing a varying current through the coil 114 is electrically connected between the electrical power source 113 and the coil 114. In this embodiment, the controller 117 also is electrically connected to the electrical power source 113, and is communicatively connected to the device 116 to control the device 116. More specifically, in this embodiment, the controller 117 is for controlling the device 116, so as to control the supply of electrical power from the electrical power source 113 to the coil 114. In this embodiment, the controller 117 comprises an integrated circuit (IC), such as an IC on a printed circuit board (PCB). In other embodiments, the controller 117 may take a different form. In some embodiments, the apparatus may have a single electrical or electronic component comprising the device 116 and the controller 117. The controller 117 is operated in this embodiment by user-operation of the user interface 118. In this embodiment, the user interface 118 is located at the exterior of the body 110. The user interface 518 may comprise a push-button, a toggle switch, a dial, a touchscreen, or the like. In other embodiments, the user interface 118 may be remote and connected to the rest of the apparatus wirelessly, such as via Bluetooth.

In this embodiment, operation of the user interface 118 by a user causes the controller 117 to cause the device 116 to cause an alternating electrical current to pass through the coil 114. This causes the coil 114 to generate an alternating magnetic field. The coil 114 and the heating zone 111 of the apparatus 100 are suitably relatively positioned so that, when the article 10 is located in the heating zone 111, the varying magnetic field produced by the coil 114 penetrates the heating element 3 of the article 10. As the cobalt of the cobalt coating 3*b* of the heating element 3 is an electrically-conductive material, this penetration causes the generation of one or more eddy currents in the cobalt coating 3*b* of the heating element 3. The flow of eddy currents against the electrical resistance of the cobalt causes the cobalt coating 3*b* to be heated by Joule heating. As cobalt is ferromagnetic, the orientation of magnetic dipoles in the cobalt may change with the changing applied magnetic field, which causes heat to be generated in the cobalt coating 3*b* of the heating element 3. The heat energy generated in the cobalt coating 3*b* passes to the aerosolizable material of the article 30.

The apparatus 100 of this embodiment comprises a temperature sensor 119 for sensing a temperature of the heating zone 111. The temperature sensor 119 is communicatively connected to the controller 117, so that the controller 117 is able to monitor the temperature of the heating zone 111. On the basis of one or more signals received from the temperature sensor 119, the controller 117 may cause the device 116 to adjust a characteristic of the varying or alternating electrical current passed through the coil 114 as necessary, in order to ensure that the temperature of the heating zone 111 remains within a predetermined temperature range. The characteristic may be, for example, amplitude or frequency or duty cycle. Within the predetermined temperature range, in use the aerosolizable material within an article located in the heating zone 111 is heated sufficiently to volatilize at least one component of the aerosolizable material without combusting the aerosolizable material. Accordingly, the controller 117, and the apparatus 100 as a whole, is arranged to heat the aerosolizable material to volatilize the at least one component of the aerosolizable material without combusting the aerosolizable material. In some embodiments, the temperature range is about 50° C. to about 300° C., such as between about 50° C. and about 250° C., between about 50° C. and about 150° C., between about 50° C. and about 120° C., between about 50° C. and about 100° C., between about 50° C. and about 80° C., or between about 60° C. and about 70° C. In some embodiments, the temperature range is between about 170° C. and about 220° C. In other embodiments, the temperature range may be other than this range. In some embodiments, the upper limit of the temperature range could be greater than 300° C. In some embodiments, the temperature sensor 119 may be omitted. In some embodiments, the coating 3*b* of the heating element 3 may comprise an alloy of cobalt that has a Curie point temperature selected on the basis of the maximum temperature to which it is desired to heat the coating 3*b*, so that further heating above that temperature by induction heating the coating 3*b* is hindered or prevented.

Figure 8:
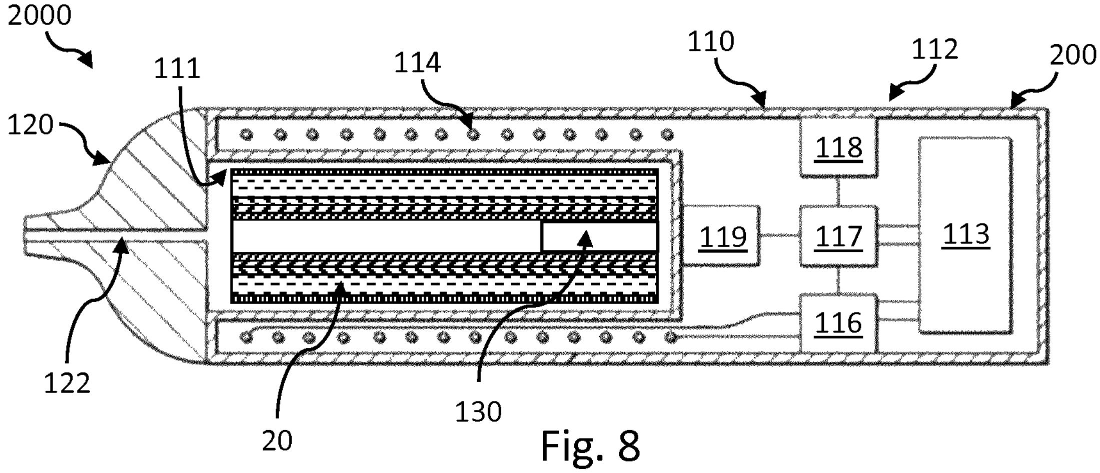
FIG. 8 shows a schematic cross-sectional side view of an example of a system comprising the article of FIG. 6 and apparatus for heating aerosolizable material of the article to volatilize at least one component of the aerosolizable material.

FIG. 8 shows a schematic cross-sectional side view of an example of another system according to an embodiment of the disclosure. The system 2000 comprises the article 20 of FIG. 6 and apparatus 200 for heating the aerosolizable material 21 of the article 20 to volatilize at least one component of the aerosolizable material 21. In other embodiments, the article 20 may be replaced by any of the other articles described herein. Any of the herein-described possible variations to the apparatus of FIG. 7 may be made to the apparatus of FIG. 8 to form further embodiments of apparatus and/or further embodiments of a system.

In this embodiment, the apparatus 200 is the same as the apparatus 100 shown in FIG. 7 (and so like features are indicated with like reference numerals), except that the apparatus 200 of FIG. 8 comprises a support 130 that is locatable in the hollow inner region 4*d* of the article 20 to position the article 20 at a predetermined location in the heating zone 111 in use. This can help correctly position the heating element 4 of the article 20 relative to the coil 114 of the apparatus 200. Operation of the apparatus 200 and its effect on the article 20 is otherwise substantially as described above and so will not be described again for conciseness.

Figure 9:
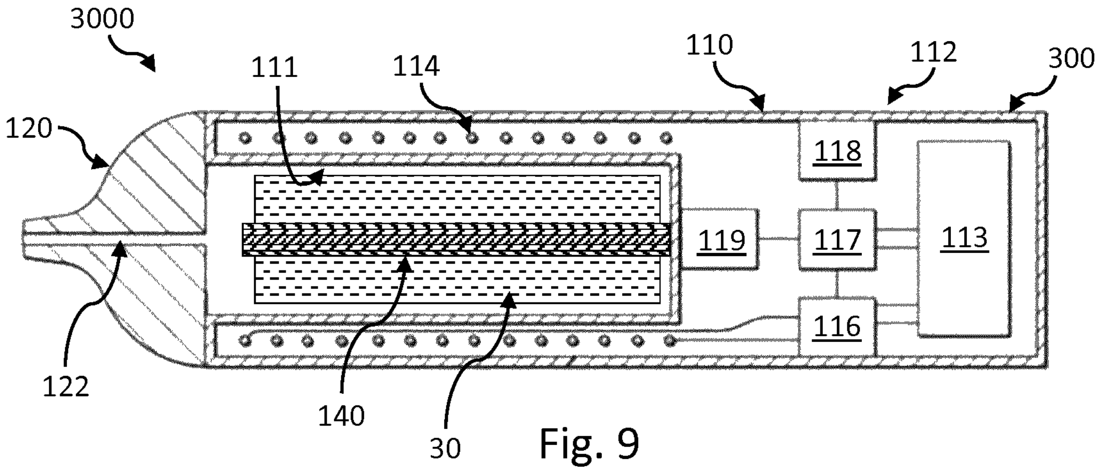
FIG. 9 shows a schematic cross-sectional side view of an example of a system comprising an article comprising aerosolizable material and an apparatus comprising the heating element of FIG. 3.

FIG. 9 shows a schematic cross-sectional side view of an example of another system according to an embodiment of the disclosure. The system 3000 comprises an article 30 comprising aerosolizable material. The system 3000 also comprises apparatus 300 for heating the aerosolizable material of the article 30 to volatilize at least one component of the aerosolizable material. In other embodiments, the article 30 may be replaced by any of the other articles described herein. Any of the herein-described possible variations to the apparatus of FIG. 7 or FIG. 8 may be made to the apparatus of FIG. 9 to form further embodiments of apparatus and/or further embodiments of a system.

In this embodiment, the apparatus 300 is the same as the apparatus 100 shown in FIG. 7 (and so like features are indicated with like reference numerals), except that the apparatus 300 of FIG. 9 itself comprises a heating element 140 for heating the heating zone 111. The heating element 140 projects into the heating zone 111. The heating element 140 is the same as the heating element 3 of FIG. 3, and so comprises a heat resistant support 3*a*, a coating 3*b* comprising cobalt located on the support 3*a*, and a heat resistant protective coating 3*c* arranged so that the cobalt coating 3*b* is located between the support 3*a* and the heat resistant protective coating 3*c*. Any of the herein-described possible variations to the heating element 3 of FIG. 3 may be made to the heating element 140 of the apparatus of FIG. 9 to form further embodiments of apparatus and/or further embodiments of a system. For example, in some embodiments, the heat resistant protective coating 3*c* may be omitted from the heating element 140 of the apparatus 300. In some embodiments, the heating element of the apparatus 300 at least partially surrounds the heating zone 111 additionally or alternatively to projecting into the heating zone 111.

Figure 10:
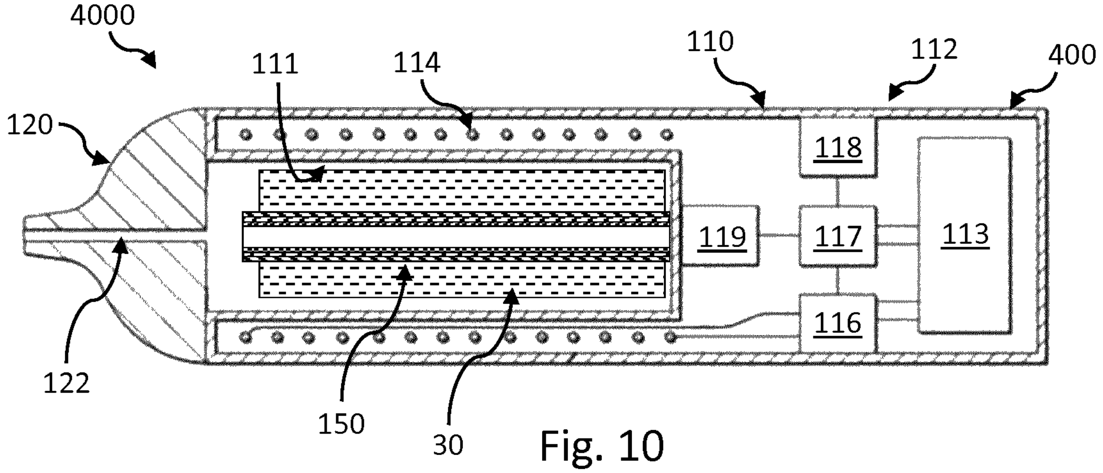
FIG. 10 shows a schematic cross-sectional side view of an example of a system comprising an article comprising aerosolizable material and an apparatus comprising the heating element of FIG. 4.

FIG. 10 shows a schematic cross-sectional side view of an example of another system according to an embodiment of the disclosure. The system 4000 comprises an article 40 comprising aerosolizable material. The system 4000 also comprises apparatus 400 for heating the aerosolizable material of the article 40 to volatilize at least one component of the aerosolizable material. In other embodiments, the article 40 may be replaced by any of the other articles described herein. Any of the herein-described possible variations to the apparatus of FIG. 7 or FIG. 8 or FIG. 9 may be made to the apparatus of FIG. 10 to form further embodiments of apparatus and/or further embodiments of a system.

In this embodiment, the apparatus 400 is the same as the apparatus 300 shown in FIG. 9 (and so like features are indicated with like reference numerals), except that the heating element of the apparatus 400 of FIG. 10 is the same as the heating element 4 of FIG. 4. The heating element 150 therefore comprises a heat resistant support 4*a*, a coating 4*b* comprising cobalt located on and radially outwards of the support 4*a*, and a heat resistant protective coating 4*c* arranged so that the cobalt coating 4*b* is located between the support 4*a* and the heat resistant protective coating 4*c*. Any of the herein-described possible variations to the heating element 4 of FIG. 4 may be made to the heating element 150 of the apparatus of FIG. 10 to form further embodiments of apparatus and/or further embodiments of a system. For example, in some embodiments, the heat resistant protective coating 4*c* may be omitted from the heating element 150 of the apparatus 400.

In each of the systems 3000, 4000 of FIGS. 9 and 10, the coil 114 and the heating element 140, 150 of the apparatus 300, 400 are suitably relatively positioned so that the varying magnetic field produced by the coil 114 penetrates the heating element 140, 150 in use. As the cobalt of the cobalt coating 3*b*, 4*b* of the heating element 140, 150 is an electrically-conductive material, this penetration causes the generation of one or more eddy currents in the cobalt coating 3*b*, 4*b* of the heating element 140, 150. The flow of eddy currents against the electrical resistance of the cobalt causes the heating element 140, 150 to be heated by Joule heating. As cobalt is ferromagnetic, the orientation of magnetic dipoles in the cobalt may change with the changing applied magnetic field, which causes heat to be generated in the cobalt coating 3*b*, 4*b* of the heating element 140, 150.

In each of the systems 3000, 4000 of FIGS. 9 and 10, the heating element 140, 150 is locatable in the article 30, 40 (such as in a pre-existing hollow region of the article 30, 40, or by displacing some of the aerosolizable material of the article 30, 40) when the article 30, 40 is inserted into the heating zone 111, so that the heat generated in the heating element 140, 150 is efficiently passed by conduction (and/or possibly convection) to the aerosolizable material of the article 30, 40 when the article 30, 40 is located in the heating zone 111. Operation of the apparatus 300, 400 and its effect on the article 30, 40 is otherwise substantially as described above and so will not be described again for conciseness.

In some embodiments, the article 30, 40 of one of the systems 3000, 4000 may include a heating element that is heatable by penetration with a varying magnetic field produced by the coil 114. Accordingly, the aerosolizable material of the article 30, 40 may be heated by one or both of the heating element of the article 30, 40 and the heating element 140, 150 of the apparatus 300, 400.

In some embodiments, the coating comprising cobalt consists only of cobalt. However, in other embodiments, in addition to cobalt, the coating may comprise one or more materials selected from the group consisting of: an electrically-conductive material, a magnetic material, and a magnetic electrically-conductive material. In some embodiments, the coating may comprise a cobalt alloy. In some embodiments, the coating comprising cobalt may also comprise one or more materials selected from the group consisting of: aluminum, gold, iron, nickel, conductive carbon, graphite, steel, plain-carbon steel, mild steel, stainless steel, ferritic stainless steel, copper, and bronze. Other heating material(s) in addition to cobalt may be used in other embodiments.

In some embodiments, the heating element is a free from holes or discontinuities. In some embodiments, the heating element comprises a foil. However, in some embodiments, the heating element may have holes or discontinuities. For example, in some embodiments, the heating element may comprise a mesh, a perforated sheet, or a perforated foil.

In some embodiments, the heating element comprises or consists of a stainless steel heat resistant support, a cobalt coating on the support, and a heat resistant protective coating comprising titanium nitride, the cobalt coating being located between the support and the heat resistant protective coating.

The cobalt coating may have a skin depth, which is an exterior zone within which most of an induced electrical current and/or induced reorientation of magnetic dipoles occurs. By providing that the cobalt coating has a relatively small thickness, a greater proportion of the cobalt coating may be heatable by a given varying magnetic field, as compared to heating material having a depth or thickness that is relatively large as compared to the other dimensions of the heating material. Thus, a more efficient use of material is achieved and, in turn, costs are reduced.

In some embodiments, the aerosolizable material comprises tobacco. However, in other embodiments, the aerosolizable material may consist of tobacco, may consist substantially entirely of tobacco, may comprise tobacco and aerosolizable material other than tobacco, may comprise aerosolizable material other than tobacco, or may be free from tobacco. In some embodiments, the aerosolizable material may comprise a vapor or aerosol forming agent or a humectant, such as glycerol, propylene glycol, triacetin, or diethylene glycol. In some embodiments, the aerosolizable material is non-liquid aerosolizable material, and the apparatus is for heating non-liquid aerosolizable material to volatilize at least one component of the aerosolizable material.

In some embodiments, the article 10, 20, 30 is a consumable article. Once all, or substantially all, of the volatilizable component(s) of the aerosolizable material in the article 10, 20, 30 has/have been spent, the user may remove the article 10, 20, 30 from the heating zone 111 of the apparatus 100, 200, 300, 400 and dispose of the article 10, 20, 30. The user may subsequently re-use the apparatus 100, 200, 300, 400 with another of the articles 10, 20, 30. \However, in other respective embodiments, the article may be non-consumable, and the apparatus and the article may be disposed of together once the volatilizable component(s) of the aerosolizable material has/have been spent.

In some embodiments, the article 10, 20, 30 is sold, supplied or otherwise provided separately from the apparatus 100, 200, 300, 400 with which the article 10, 20, 30 is usable. However, in some embodiments, the apparatus 100, 200, 300, 400 and one or more of the articles 10, 20, 30 may be provided together as a system, such as a kit or an assembly, possibly with additional components, such as cleaning utensils.

In order to address various issues and advance the art, the entirety of this disclosure shows by way of illustration and example various embodiments in which the claimed invention may be practiced and which provide for superior heating elements for use in heating aerosolizable material to volatilize at least one component of the aerosolizable material, articles for use with apparatus for heating aerosolizable material to volatilize at least one component of the aerosolizable material, apparatus for heating aerosolizable material to volatilize at least one component of the aerosolizable material, and systems comprising such articles and/or such apparatus. The advantages and features of the disclosure are of a representative sample of embodiments only, and are not exhaustive and/or exclusive. They are presented only to assist in understanding and teach the claimed and otherwise disclosed features.

It is to be understood that advantages, embodiments, examples, functions, features, structures and/or other aspects of the disclosure are not to be considered limitations on the disclosure as defined by the claims or limitations on equivalents to the claims, and that other embodiments may be utilized and modifications may be made without departing from the scope and/or spirit of the disclosure. Various embodiments may suitably comprise, consist of, or consist in essence of, various combinations of the disclosed elements, components, features, parts, steps, means, etc. The disclosure may include other inventions not presently claimed, but which may be claimed in future.

The invention claimed is:

1. A heating element for use in heating aerosolizable material to volatilize at least one component of the aerosolizable material, the heating element comprising:

a heat resistant support located between two volumes of a coating comprising cobalt;

wherein the support comprises one or more materials selected from the group consisting of a metal and a metal alloy; and wherein the heating element is planar or substantially planar.

2. The heating element of claim 1, wherein the coating has a thickness of no more than 50 microns.

3. The heating element of claim 1, comprising a heat resistant protective coating, wherein the coating comprising cobalt is located between the heat resistant support and the heat resistant protective coating.

4. The heating element of claim 3, wherein the heat resistant protective coating comprises one or more materials selected from the group consisting of: a ceramics material, metal nitride, titanium nitride, and diamond.

5. The heating element of claim 3, wherein the heat resistant protective coating has a thickness of no more than 50 microns.

6. An article for use with an apparatus for heating aerosolizable material to volatilize at least one component of the aerosolizable material, the article comprising the heating element of claim 1, and aerosolizable material in thermal contact with the heating element.

7. The article of claim 6, wherein the aerosolizable material is in surface contact with the heating element.

8. The article of claim 6, wherein the aerosolizable material is reconstituted, cellulosic, or in gel form.

9. The article of claim 6, wherein the aerosolizable material comprises at least one of tobacco or one or more humectants.

10. The article of claim 6, wherein the article is substantially cylindrical.

11. A system for heating aerosolizable material to volatilize at least one component of the aerosolizable material, the system comprising:

the article of claim 6; and an apparatus for heating the aerosolizable material of the article to volatilize at least one component of the aerosolizable material of the article, the apparatus comprising a heating zone for receiving the article, and a device for causing heating of the heating element of the article when the article is in the heating zone.

12. The system of claim 11, wherein the device comprises a magnetic field generator for generating a varying magnetic field for penetrating the heating element of the article when the article is in the heating zone.

13. An apparatus for heating aerosolizable material to volatilize at least one component of the aerosolizable material, the apparatus comprising:

a heating zone for receiving an article comprising aerosolizable material;

the heating element of claim 1 for heating the heating zone; and a device for causing heating of the heating element.

14. The apparatus of claim 13, wherein the device comprises a magnetic field generator for generating a varying magnetic field for penetrating the heating element in use.

15. The apparatus of claim 13, wherein the heating element projects into the heating zone.

16. A system for heating aerosolizable material to volatilize at least one component of the aerosolizable material, the system comprising:

the apparatus of claim 13; and the article for locating in the heating zone of the apparatus.

* * * * *